Aug. 10, 1937.  W. P. ANDERSON  2,089,169
BEARING BLANK BENDING MACHINE
Filed Oct. 24, 1936  3 Sheets-Sheet 2
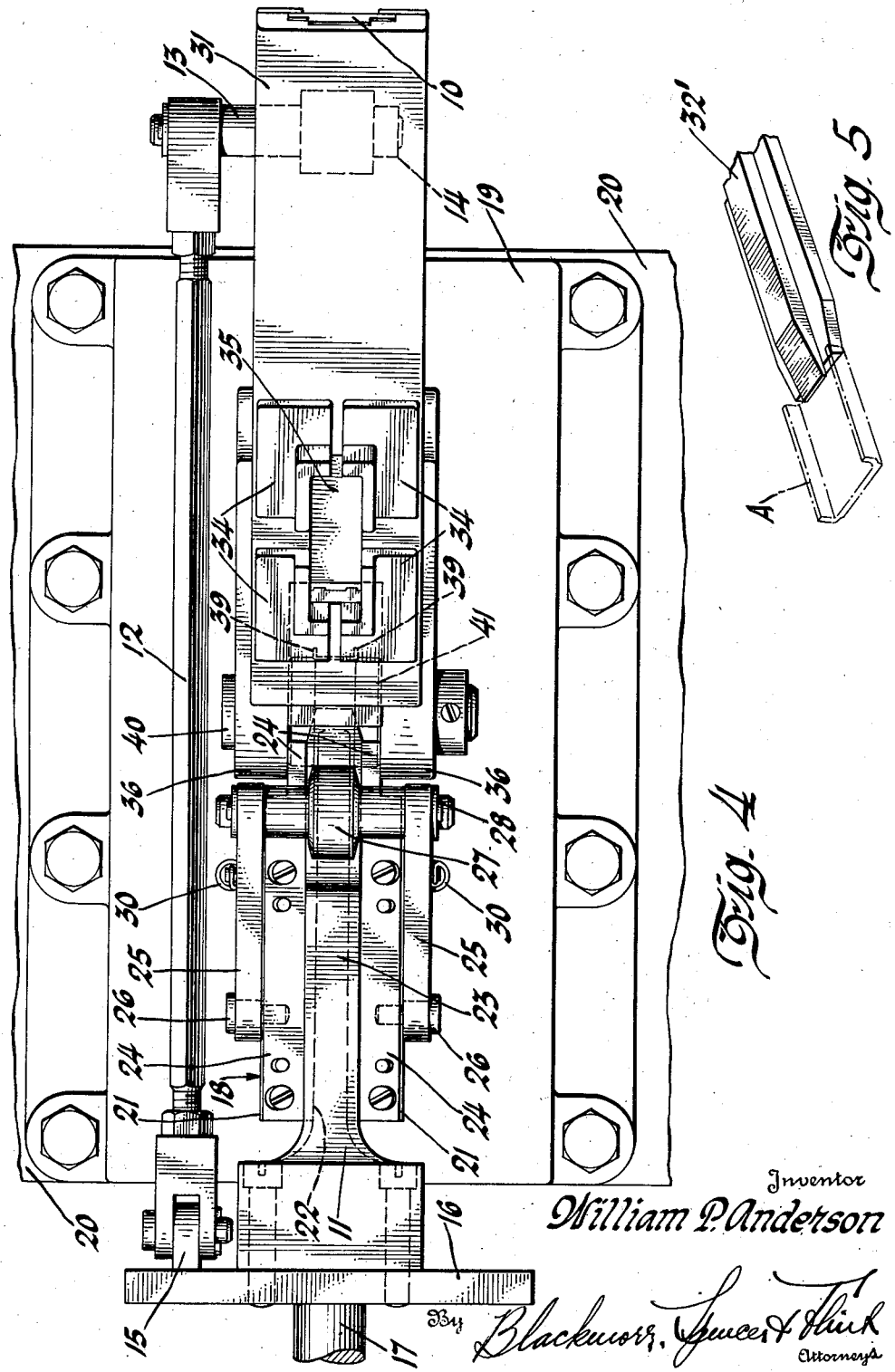

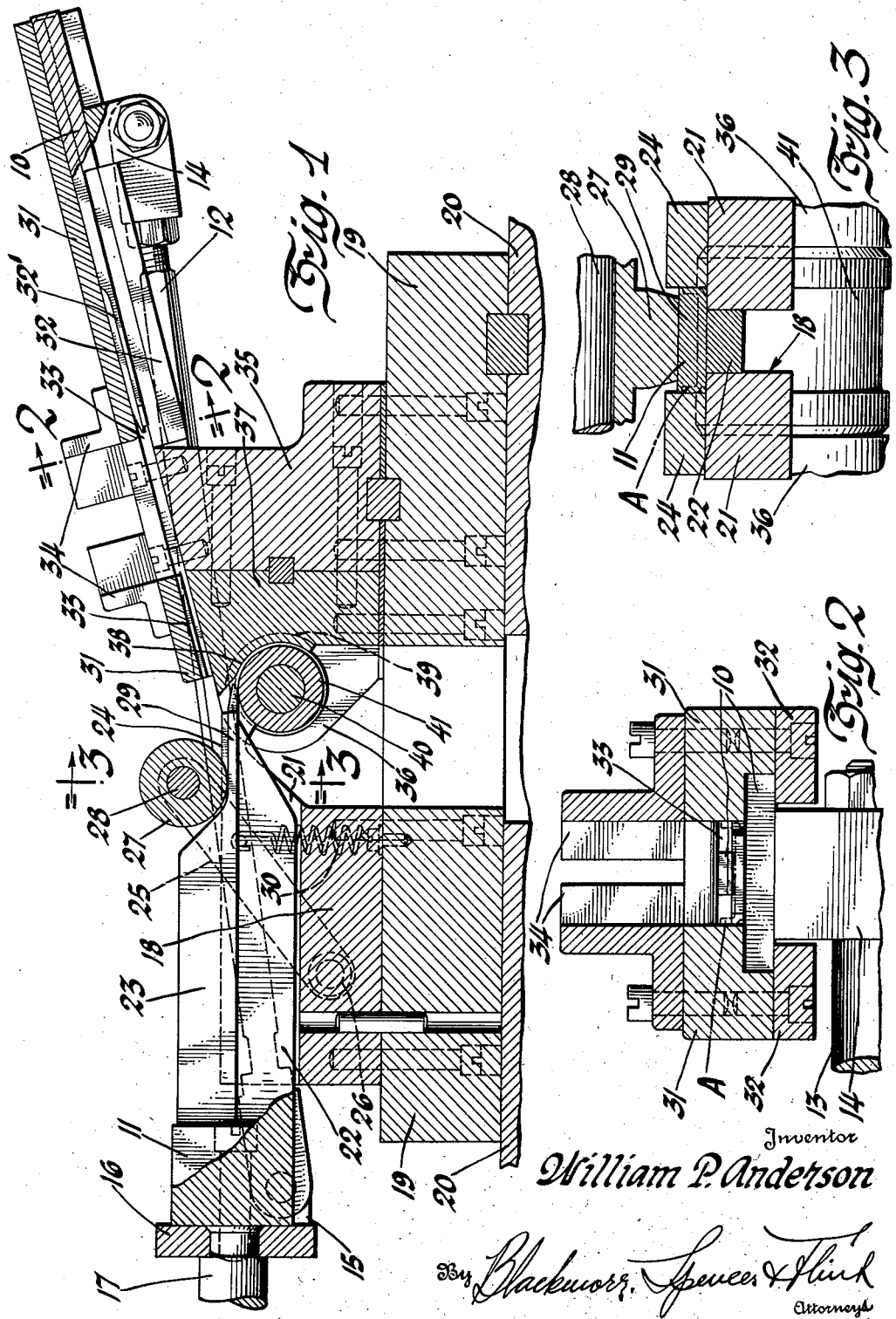

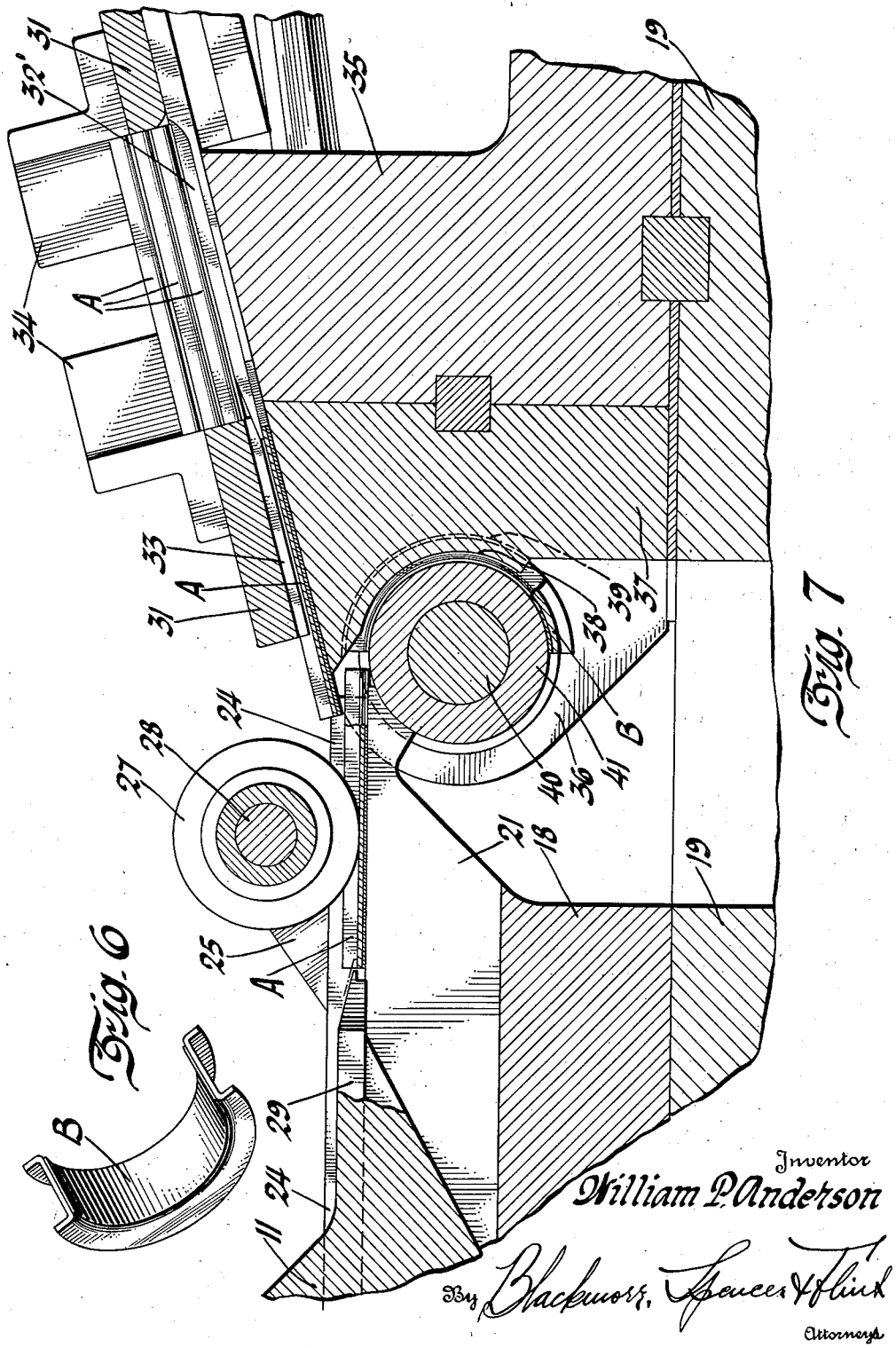

Patented Aug. 10, 1937

2,089,169

UNITED STATES PATENT OFFICE 2,089,169

BEARING BLANK BENDING MACHINE

William P. Anderson, Flint, Mich., assignor to General Motors Corporation, Detroit, Mich., a corporation of Delaware Application October 24, 1936, Serial No. 107,315

7 Claims. (Cl. 153—48)

The object of my invention is to provide a machine for bending flat bearing blanks into semi-circular form to provide half bearings for use, for example, as crank pin or crank shaft bearings for internal combustion engines, and the particular embodiment thereof herein disclosed is adapted to operate upon bearing blanks of channel form so that the resulting half bearings, two being used to provide a complete bearing, have side flanges; although the machine wherein my invention consists may be used to bend bearing blanks without side flanges, in which case the bearing members produced have no side flanges.

With the above and other objects of invention in view, my invention consists in the improved bearing blank bending machine illustrated in the accompanying drawings and hereinafter described and claimed, and in such variations and modifications thereof, within the scope of the concluding claims, as will be obvious to those skilled in the art to which my invention relates.

In the drawings wherein the preferred form of my invention is illustrated:

Figure 1 is a view showing a section of my improved bearing blank bending machine, upon a vertical plane extending longitudinally thereof.

Figure 2 is a view showing a section taken upon a vertical transverse plane indicated by the line 2—2, Figure 1.

Figure 3 is a view showing a section upon a plane indicated by the line 3—3, Figure 1.

Figure 4 is a view showing my invention in plan.

Figure 5 is a fragmentary perspective view illustrating how bearing blanks are pushed along by a sliding member of my improved machine.

Figure 6 is a perspective view showing a half bearing member produced by bending a flat channel-shaped blank into semi-circular form.

Figure 7 is a fragmentary view showing a section upon a larger scale than Figure 1, and likewise upon a vertical longitudinally extending plane, the same being submitted to better and more clearly explain the operation of my invention.

Referring now to the drawings, the numerals 10, 11 designate two reciprocating slides which are connected together so as to move in unison and in mutually opposite directions by a tie rod 12 the right hand end of which is pivotally connected to an arm 13 carried by a lug 14 depending from the slide 10, and the left hand end of which is pivotally connected to a lug 15 carried by a head 16 to which the slide 11 is fastened by suitable screws as indicated in Figure 1. The head 16 and the slides are operated by a rod 17 to which reciprocating movement is communicated by any suitable operating means or device.

The slide 11 is supported by a support and guide member 18 which in turn is fastened to an auxiliary base 19 secured to the main base 20 of the machine, said support having upwardly extending side parts 21 spaced apart from one another and between which a depending part 22 of the slide 11 moves. The upper part 23 of the slide 11 is made wider than the lower part and rests upon the upper sides of the side parts 21, see Figure 3, and two gibs 24, 24 engage the sides of the slide 11 to guide it as it reciprocates upon the upper ends of the side parts 21.

The numerals 25, 25 designate links pivotally secured to the support 18 upon opposite sides thereof, as indicated by the numerals 26, and a roller 27 rotatable upon a shaft 28 extending between the free ends of said arms rests upon bearing blanks A, see Figure 7, before they are pushed to the right during the bending operation, and rests upon the front end 29 of the slide 11 as said slide approaches the end of its movement toward the right, during which movement the extremity of said front end portion engages the blank A and forces it into engagement with bending die mechanism as will hereinafter appear. Coil springs 30, 30 act to pull the roller 27 against the blank A and the extremity 29 of the reciprocating slide 11.

The numeral 31 designates a support and guide member for the blank feeding slide 10 which reciprocates in a channel formed in the under side of said member, and is held in place in said channel by gibs 32, see Figure 2; and said slide has an extending portion 32' which is narrower than the rest of the slide and which operates in a groove 33. Secured to the upper surface of the support and guide member 31 is a magazine 34 adapted to receive and contain one or more bearing blanks A; and when the machine is in operation the extremity of the extending portion 32' engages the lower one of the blanks in said magazine and pushes it along the groove 33 and beneath the roller 27, the blank being left resting upon the upwardly extending side parts 21 and between the gibs 24, see Figures 3 and 7, which side parts form a support for the blanks. The purpose of the roller 27 is to hold the blanks upon and in firm contact with the upwardly extending sides 21 of the support and guide member 18 after they have been pushed onto the blank support provided by said sides, and while the blanks are being pushed off said sides and into engagement with the die device for bending them into semi-circular form to be next described.

The support and guide member 31 is fastened to the upper end of a pedestal and die holding member 35 which is carried by and secured to the auxiliary base 19, and which member has side arms 36, 36 extending to the left, see Figures 1 and 7. A stationary die block 37 having a curved face 38, and side grooves 39 to receive the side flanges of the blank A, is located between said side arms and is secured in place and to the pedestal 35 as indicated in Figure 1; the upper ends of the said die block and the upper end of the pedestal 35 lying in a single and preferably slightly inclined plane which coincides with the lower side of the groove 33 down which the blanks A pass, see Figures 1 and 7. Located between the left hand ends of the side arms 36 and rotatable upon a journal 40 the ends of which are supported by said arms is a cylindrical member 41 the periphery of which is spaced from the curved face 38, and which member cooperates with the curved face 38 to form a shaping die which bends the flat bearing blanks A into curved semi-cylindrical bearing members B shown in Figure 6, as the blank is forced to the right by the slide 11; each subsequent blank as it is forced into the curved space between the member 41 and the die block 37 forcing the bent blank ahead of it along and beyond said members, whereupon the curved bearing members fall through an opening in the auxiliary base 19 and pass from the machine. After the blanks are thus bent into semi-cylindrical form the bearing members are ordinarily finished in pairs to the dimensions required in finished bearings which finishing operation, however, forms no part of the invention to which this present application relates.

Having thus described and explained my invention I claim and desire to secure by Letters Patent:

1. In a bearing blank bending machine of the class described, two oppositely movable reciprocating slides arranged in line and connected together so as to move in unison with one another; a blank support; a blank magazine associated with one of said slides and from which a blank is pushed by said slide onto said support; and a die device located below said slides and of such form as to bend said blank into semi-circular form; the arrangement being such that the other of said slides pushes said blank from said support and forces it into engagement with said die device.

2. In a bearing blank bending machine of the class described, two oppositely movable reciprocating slides arranged in line and connected together so as to move in unison with one another; a blank support; a blank magazine associated with one of said slides and from which a blank is pushed by said slide onto said support; and a die device located below said slides, said die device comprising a stationary die block having a curved face and a cooperating member spaced from said face so as to provide a curved space between the two; the arrangement being such that the other of said slides pushes said blank from said support and forces it between said cooperating member and said curved face.

3. In a bearing blank bending machine of the class described, two oppositely movable reciprocating slides arranged in line and connected together so as to move in unison with one another; a blank support; a blank magazine associated with one of said slides and from which a blank is pushed by said slide onto said support; and a die device located below said slides, said die device comprising a stationary die block having a curved face, and a rotatable cylindrical member spaced from said face so as to provide a curved space between the two; the arrangement being such that the other of said slides pushes said blank from said support and forces it between said cylindrical member and said curved face.

4. In a bearing blank bending machine of the class described, two oppositely movable reciprocating slides arranged in line and connected together so as to move in unison with one another; a blank support; a blank magazine associated with one of said slides and from which a blank is pushed by said slide onto said support; and a die device located below said slides, said die device comprising a pedestal having side arms spaced apart from one another, a stationary die block having a curved face arranged between said arms, and a rotatable cylindrical member supported by and between said arms and spaced from said face so as to provide a curved space between the two; the arrangement being such that the other of said slides pushes said blank from said support and forces it between said cylindrical member and said curved face.

5. In a bearing blank bending machine of the class described, a support and guide member; a blank support carried by said member; a reciprocating slide supported by said support and guide member; a pedestal arranged in line with said support and guide member; a second reciprocating slide supported by said pedestal and so arranged as to move a blank onto said blank support; means for causing said two slides to move in unison and in opposite directions; and a die device located below said slides and of such form as to bend said blank into semi-circular form; the arrangement being such that said first mentioned slide pushes said blank from said blank support and forces it into engagement with said die device when the machine is in operation.

6. In a bearing blank bending machine of the class described, a support and guide member having upwardly extending sides spaced apart from one another; a reciprocating slide supported by said sides; a pedestal arranged in line with said support and guide member; a second reciprocating slide supported by said pedestal and so arranged as to move a blank onto said upwardly extending sides; means for causing said two slides to move in unison and in opposite directions; and a die device located below said slides and of such form as to bend said blank into semi-circular form; the arrangement being such that said first mentioned slide pushes said blank from said upwardly extending slides and forces it into engagement with said die device when the machine is in operation.

7. In a bearing blank bending machine of the class described, a support and guide member having upwardly extending sides spaced apart from one another; a reciprocating slide supported by said sides; a pedestal arranged in line with said support and guide member; a second reciprocating slide supported by said pedestal and so arranged as to move a blank onto said upwardly extending sides; a roller pivotally supported from said support and die member and adapted to rest upon a blank supported by said sides; means for causing said two slides to move in unison and in opposite directions; and a die device located below said slides and of such form as to bend said blank into semi-circular form; the arrangement being such that said first mentioned slide pushes said blank from beneath said roller and from said upwardly extending slides and forces it into engagement with said die device when the machine is in operation.

WILLIAM P. ANDERSON.